(12) United States Patent
Fortin et al.

(10) Patent No.: US 7,543,171 B2
(45) Date of Patent: Jun. 2, 2009

(54) METHOD AND SYSTEM FOR DYNAMIC TEMPERATURE COMPENSATION FOR A SOURCE-SYNCHRONOUS INTERFACE

(75) Inventors: Eric Fortin, Nepean (CA); David Martin Harvey, Kanata (CA); Hayrettin Buyuktepe, Kanata (CA)

(73) Assignee: Alcatel Lucent, Paris (FR)

( * ) Notice: Subject to any disclaimer, the term of this patent is extended or adjusted under 35 U.S.C. 154(b) by 508 days.

(21) Appl. No.: 11/482,697

(22) Filed: Jul. 10, 2006

(65) Prior Publication Data
US 2008/0010479 A1    Jan. 10, 2008

(51) Int. Cl.
G06F 1/12 (2006.01)
G06F 13/42 (2006.01)

(52) U.S. Cl. .............. 713/400; 713/401; 327/262
(58) Field of Classification Search ........... 713/400; 327/262
See application file for complete search history.

(56) References Cited

U.S. PATENT DOCUMENTS

| | | | |
|---|---|---|---|
| 5,794,020 A * | 8/1998 | Tanaka et al. | 713/401 |
| 6,452,421 B2 * | 9/2002 | Saito | 326/93 |
| 6,505,149 B1 * | 1/2003 | Griswold et al. | 703/14 |
| 7,222,036 B1 * | 5/2007 | Thorne | 702/79 |
| 7,453,302 B2 * | 11/2008 | Le et al. | 327/262 |

\* cited by examiner

Primary Examiner—Nitin C Patel

(57) ABSTRACT

A method for synchronizing a data signal to a clock signal in a source-synchronous system, the source-synchronous system having first and second systems linked by an interface, the first system providing the clock signal to the second system, the second system providing the data signal and a return clock signal synchronous to the data signal to the first system, the method comprising: determining a first time delay between the clock signal and the return clock signal and delaying the data signal by the first time delay; after a predetermined period, determining a second time delay between the clock signal and the return clock signal; determining a difference between the first and second time delays; and, further delaying the data signal by at least a portion of the difference to thereby compensate for a temperature change of the source-synchronous system.

20 Claims, 3 Drawing Sheets

METHOD AND SYSTEM FOR DYNAMIC TEMPERATURE COMPENSATION FOR A SOURCE-SYNCHRONOUS INTERFACE

FIELD OF THE INVENTION

This invention relates to the field of synchronous interfaces between electronic devices, and more specifically, to a method and system for dynamic temperature compensation for a source-synchronous interface between a field-programmable gate array device and a memory device.

BACKGROUND OF THE INVENTION

A field-programmable gate array ("FPGA") is an integrated circuit ("IC") that can be programmed in the field after manufacture. FPGAs typically contain programmable logic components and programmable interconnects. The programmable logic components can be programmed to duplicate the functionality of basic logic gates such as AND, OR, XOR, NOT or more complex combinatorial functions such as decoders or simple math functions. In most FPGAs, these programmable logic components (or logic blocks, in FPGA parlance) also include memory elements, which may be simple flip-flops or more complete blocks of memories. A hierarchy of programmable interconnects allows the logic blocks of an FPGA to be interconnected as needed by the system designer, somewhat like a one-chip programmable breadboard. These logic blocks and interconnects can be programmed after the manufacturing process by the customer/designer (hence the term "field programmable") so that the FPGA can perform whatever logical function is needed.

An example of a FPGA is the Virtex™-4 FPGA from Xilinx™. The Virtex™-4 FPGA has a feature called "ChipSync Technology" which simplifies implementation of source-synchronous interfaces. For reference, a source-synchronous system is a system that uses a clock signal generated by the address/data signal source (e.g., the FPGA) to latch or clock the address/data signals at the receiving agent (e.g., a random access memory ("RAM") device such as a quad data rate (QDR™II) synchronous RAM ("SRAM") device or a reduced latency dynamic random access memory ("RLDRAM") device). Implementing a self-timed clock at the receiver eliminates the flight time variable from system timing equations. Eliminating flight time allows the designer to maximize the potential bandwidth of any interface technology by increasing the operating frequency. Because interface signal timing is now working in "relative" time, the global skew requirements of the system clock are reduced.

Thus, in a source-synchronous interface the clock is usually sent along with the data. The FPGA uses the clock to recover the data. For high speed SRAMs like a QDR™II SRAM, a clock is sent to the QDR™II device and data is returned along with a re-generated clock. This returned clock will be delayed with respect to the original clock (i.e., the FPGA system clock). Read data can easily be recovered using the returned clock, but getting the data back into synchronization with the system clock is another problem. The Xilinx "ChipSync Technology" feature mentioned above solves this problem by delaying the data to align it with the system clock. Thus, the returned clock is not used to recover the data.

At startup, the "ChipSync Technology" feature calibrates the amount of delay needed in order to recover the data back to the system clock of the FPGA. This calibration is intended to offset the delay caused by the board trace length and delay in the FPGA input/output ("IO") pins. The delay portion caused by the IO is dependant on process and temperature variation. Since the calibration is performed once at start-up, the FPGA may have been at a cold temperature when the calibration was performed. The cold temperature would make the IO delay minimal, but once the FPGA warms up the delay would increase. This is problematic as it reduces timing margins in recovering the data which may cause bit errors.

One solution to this problem is simply to repeat the calibration routine as the FPGA warms up. However, because the data from a double or quad data rate RAM device is both positive and negative clock edge triggered, and due to the dual stream nature of the "ChipSync Technology" circuit (i.e., positive and negative edge triggered data streams), the data may shift 180 degrees out of phase if the calibration routine is run a second time. Such an occurrence may cause data corruption, or data loss, and therefore simply re-running the timing calibration to adjust for delay variances due to temperature variation is not a desirable solution. In addition, simply using a first-in first-out ("FIFO") buffer device to align the system clock and data is not an option because of the low latency requirements of high speed FPGA applications.

A need therefore exists for an improved method and system for dynamic temperature compensation for a source-synchronous interface between a field-programmable gate array device and a memory device. Accordingly, a solution that addresses, at least in part, the above and other shortcomings is desired.

SUMMARY OF THE INVENTION

According to one aspect of the invention, there is provided a method for synchronizing a data signal to a clock signal in a source-synchronous system, the source-synchronous system having first and second systems linked by an interface, the first system providing the clock signal to the second system, the second system providing the data signal and a return clock signal synchronous to the data signal to the first system, the method comprising: determining a first time delay between the clock signal and the return clock signal and delaying the data signal by the first time delay; after a predetermined period, determining a second time delay between the clock signal and the return clock signal; determining a difference between the first and second time delays; and, further delaying the data signal by at least a portion of the difference to thereby compensate for a temperature change of the source-synchronous system.

In the above method, the first time delay may be determined during a start-up period of the source-synchronous system. The predetermined period may be one of a warm-up period and a cool-down period for the source-synchronous system. The first and second time delays may include a respective amount for centering the return clock signal with respect to the clock signal. The first system may be a field programmable gate array ("FPGA") and the second system may be a memory device. The memory device may be a reduced latency dynamic random access memory ("RLDRAM") device. The portion of the difference may be less than or equal to a refresh period for the RLDRAM device. The memory device may be a quad data rate ("QDR") synchronous random access memory ("SRAM") device. The portion of the difference may be a minimum time delay increment (e.g., 1 step) chosen to limit the further delaying of the data signal to prevent data signal errors. And, the portion of the difference may be an expected delay due to the temperature change.

In accordance with further aspects of the present invention there is provided an apparatus such as a data processing system, a method for adapting this system, as well as articles of manufacture such as a computer readable medium having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

Figure 1:
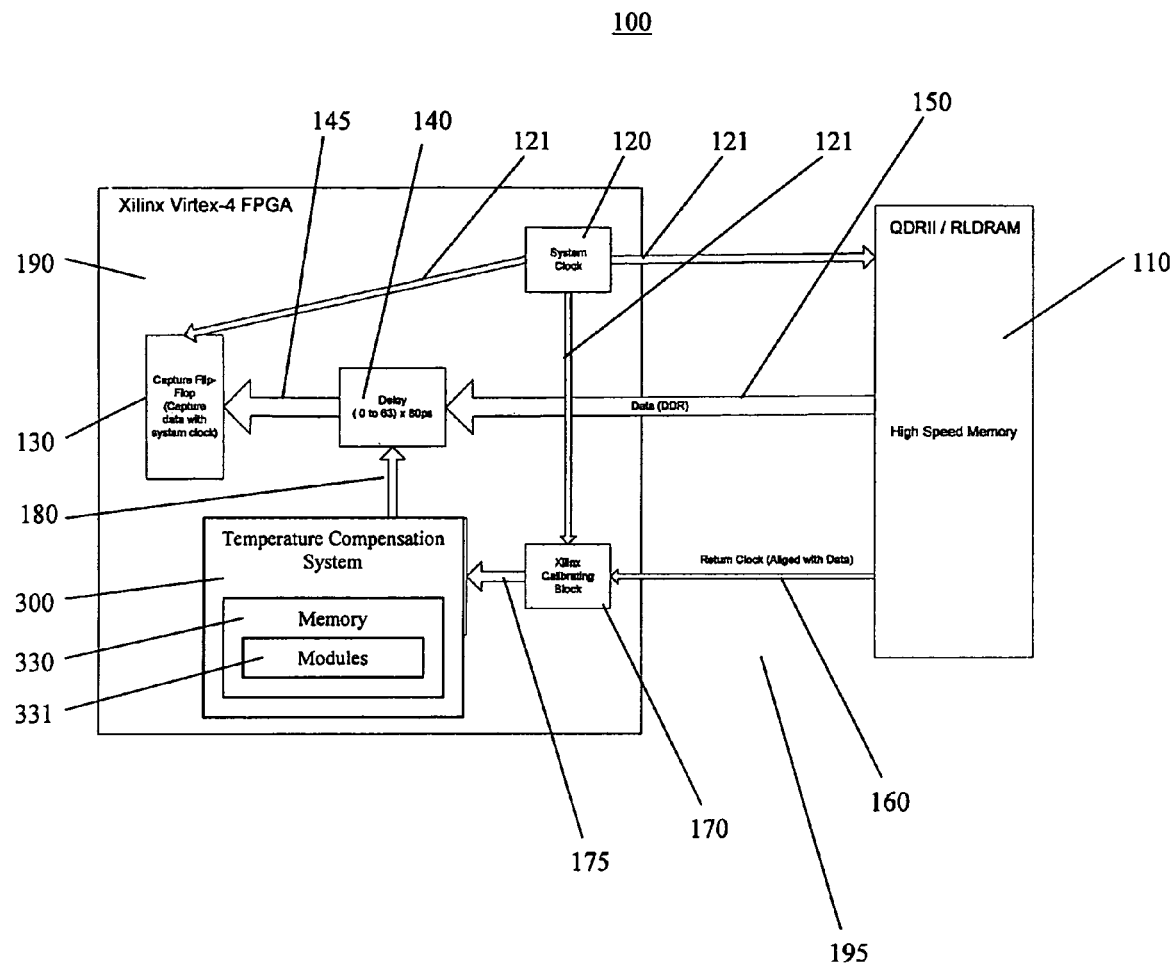
FIG. 1 is a block diagram illustrating a source-synchronous system in accordance with an embodiment of the invention.

FIG. 1 is a block diagram illustrating a source-synchronous system 100 in accordance with an embodiment of the invention. The source-synchronous system 100 includes a FPGA 190 coupled to a high speed memory device 110 through an interface 195. The FPGA 190 may be a Xilinx Virtex™-4 FPGA and the high speed memory device 110 may be a QDR™II or RLDRAM device. The FPGA 190 includes a system clock 120, a capture flip flop device 130 (i.e., for capturing data with the system clock), a delay unit 140, a calibrating block 170, and a temperature compensation system 300. The system clock 120 provides a system clock signal 121 to the memory device 110, to the capture flip flop device 130, and to the calibrating block 170. Data (e.g., double data rate ("DDR") data) 150 is returned from the memory device 110 over the interface 195 and is input to the delay unit 140. The delay unit 140 provides an adjustable delay (e.g., (0 to 63)×80 pico seconds (ps)). The delayed data 145 from the delay unit 140 is provided to the capture flip flop device 130. The calibrating block 170 may implement a calibrating method such as "ChipSync Technology" by Xilinx™ to provide a delay setting 175 to the delay unit 140. In accordance with the present invention, the temperature compensation system 300 receives the delay setting 175 from the calibrating block 170 and provides a temperature compensated delay setting 180 to the delay unit 140. The temperature compensation system 300 may be implemented within the FPGA 190 or external to it. In FIG. 1, the temperature compensation system 300 is shown within the FPGA 190.

The temperature compensation system 300 may be implemented as a state machine or as a data processing system. As a data processing system, the temperature compensation system 300 may include a central processing unit ("CPU") (not shown), memory 330, and an interface device. The CPU may include dedicated coprocessors and memory devices. The memory 330 may include RAM, ROM, disk devices, and databases. And, the interface device may include a bus, serial, or network connection. The temperature compensation system 300 is adapted for communicating with other data processing systems (e.g., 110, 190) over a bus, serial, or network connection via its interface device. The CPU of the system 300 is operatively coupled to memory 330 which may store an operating system (not shown) for general management of the system 300. The temperature compensation system 300 has stored therein data representing sequences of instructions which when executed cause the method described herein to be performed. Of course, the temperature compensation system 300 may contain additional software and hardware a description of which is not necessary for understanding the invention.

Thus, the temperature compensation system 300 includes computer executable programmed instructions for directing the system 300 to implement the embodiments of the present invention. The programmed instructions may be embodied in one or more hardware modules or software modules 331 resident in the memory 330 of the temperature compensation system 300. Alternatively, the programmed instructions may be embodied on a computer readable medium (such as a CD disk or floppy disk) which may be used for transporting the programmed instructions to the memory 330 of the temperature compensation system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface to the temperature compensation system 300 from the network by end users or potential buyers.

Now, the present invention addresses the problem of timing compensation for integrated circuit ("IC") delays caused due to temperature variation (i.e., a temperature rise or fall). It particular, it provides for timing compensation for a source-synchronous interface of a FPGA (such as the Xilinx Virtex™-4 FPGA) when used with low latency, high speed RAM such as QDR™II and RLDRAM. The invention enables on-the-fly timing calibration to be performed to compensate for temperature dependent delay variation without the risk of data errors that are likely to occur when using onboard calibrating functionality (such as the "ChipSync Technology" of the Virtex™-4 FPGA) of the FPGA. In the case of the Virtex™-4 FPGA, for example, the present invention allows the delay functionality of the "ChipSync Technology" feature to be used in an on-the-fly mode without risking bit errors in the data stream 150 coming from the source-synchronous interface 195 to the FPGA 190. While the invention is discussed in the context of a FPGA such as the Virtex™-4 FPGA, it will be understood that the invention may be applied generally.

According to one embodiment of the invention, a calibration operation is performed at power-up of the FPGA 190 to generate compensation settings 175 that are applied within the FPGA 190. Once this initial calibration operation is performed, calibration operations are repeated periodically. The compensation settings of subsequent calibration operations are compared to the current compensation settings and an adjustment is made to the compensation settings if there is a difference. Only a small, limited change in timing is allowed per calibration run. This prevents large updates which could disturb the source-synchronous interface 195. In turn, this makes the timing calibration more reliable in that it protects against clock glitches or noise that could cause large variations in timing adjustment. Basically, the allowed timing adjustment per calibration run is in accordance with, or at least no greater than, the variance in delay that could be caused by temperature change between calibration runs. For a RLDRAM interface, for example, the calibration changes may be performed during a refresh window as during this window the bus is not used and hence there is no risk that timing changes may cause data errors. For a QDR™II interface, for example, there is no idle time where a large adjustment can be made and so only very small adjustments are made (e.g., 1 step).

The temperature compensation system (or state machine) 300 executes a calibration routine using the existing calibrating block 170. The calibrating block 170 uses the returned clock signal 160 (which is synchronous to the data 150) from the interface 195. The returned clock signal 160 is compared with the system clock signal 121 to determine the amount of delay needed to synchronize the data 150 with the system clock signal 121.

The calibrating block 170 (e.g., a Xilinx™ calibrating block) returns a delay setting 175 along with a phase indicator or final value ("Val") of the return clock 160, which indicates which of two positive and negative edge triggered data streams egresses first from the calibrating block 170. The phase indicator or Val along with the delay setting (i.e., a number from 0 to 63) 175 indicates the amount of IO buffer and circuit board delay within the FPGA 190. That is, it indicates how much delay must be added to the data 150 to synchronize it to the system clock 121.

The temperature compensation system (or state machine) 300 takes the final value along with the delay setting 175 and translates these into a new setting (0-63) 180, which keeps the timing adjustment between calibration runs within the aforementioned limits and avoids data loss that could occur by changing the sequence of positive and negative edge triggered data streams that egress from the calibration block 170. Consequently, the invention makes the source-synchronous system 100 more reliable over a wide range in delay (e.g., 5 ns).

Consider the case where the high speed memory 110 is a RLDRAM and the FPGA 190 is a Xilinx™ Virtex™-4 FPGA. Typically, the data 150 and return clock signal 160 transmitted from the RLDRAM 110 is edge aligned. To capture this transmitted data 150 in the Virtex™-4 FPGA 190, either the clock 160 or the data 150 is delayed. In the direct-clocking technique, the data 150 is delayed and is center aligned with respect to the internal FPGA clock 121. In this scheme, the internal FPGA clock 121 captures the transmitted data 150. The clock 160 transmitted from the memory 110 is used to determine the delay value for the associated data bits 150. The Virtex™-4 resource used by the clock 160 and the data 150 is a 64-step (i.e., 0-63 steps or taps) absolute delay line. Both the clock 160 and the data 150 are routed through the 64-step absolute delay line. Although the clock 160 is not used to capture data 150, it is used to determine the number of taps required to center the data 150 with respect to the internal FPGA clock 121.

The delay value for the data bits 150 associated with a return clock 160 is the phase difference between the rising edge of internal FPGA clock 121 and the center of the return clock pulse. The assumption is that the clock 160 and the data 150 are edge aligned. In order to determine this phase difference, the clock 160 is input through the 64-step absolute delay line and is sampled at incremental step outputs using the internal FPGA clock 121. At least two edges or transitions of the clock 160 have to be detected to determine the center of the clock pulse. The difference between the number of steps required for detection of the second transition (second edge steps), and the number of steps required for detection of the first transition (first edge steps) is the clock pulse width. Half of this difference is the pulse center (pulse center steps). The number of taps required from the rising edge of the internal FPGA clock 121 to the center of the clock pulse is the sum of first edge steps and pulse center steps.

An algorithm is used for detecting edges of the return clock 160 as follows. The return clock 160 is input to the calibrating block 170 with an initial value of 0. The return clock 160 is delayed in one-step increments until the first edge is detected. The number of steps required to detect the first edge is then recorded. The clock 160 continues to be delayed in one-step increments until the second edge is detected. The number of steps required to detect the second edge is then recorded. The pulse width is computed using both recorded values. After the pulse width of the clock 160 is determined in number of steps, the midpoint is obtained by dividing it by two. The sum of the midpoint and the number of steps required to detect the first edge is the required steps to delay data 150. This is the delay setting 175 referred to above.

The total number of steps available in the calibration unit 170 is 64. Therefore for a frequency of 200 MHz and below, it is not possible to detect two edges. At the end of 64 steps, if only one edge is detected, the number of steps required to delay data is the sum of the number of steps required to detect the first edge and 16 steps (~1.25 ns with a step resolution of ~80 ps). The quarter cycle of a 200-MHz clock is about 16 steps. Based on timing analysis, this value can also be used for lower frequencies, down to 110 MHz. For frequencies below 110 MHz, if no edges are detected at the end of 64 steps, the number of steps required to delay data is 32 steps (~2.5 ns with a step resolution of ~80 ps). This value is sufficient to set the internal FPGA clock edge within the data window.

An analysis may be performed to determine the minimum and maximum round trip delay for the RLDRAM memory interface 195. The round trip delay includes the following:
1) Source clock delay from the system clock 120 to the RLDRAM 110 (including high speed transceiver logic ("HSTL") driver delay and clock tracking delay to the RLDRAM 110);
2) RLDRAM clock to output data 150; and,
3) Read data delay from the RLDRAM 110 to the delay unit 140 (includes HSTL and tracking delays).

The round trip delay is typically 3.75 nano seconds (ns). Note that there is 90 degree phase shift or one-quarter cycle delay between the system clock 120 and the clock signal ("CK") 121 sent out to the RLDRAM 110. For a cycle time of 5 ns, this one-quarter cycle delay amounts to 1.25 ns. This 1.25 ns delay is not included in the round trip delay of 3.75 ns measured above. In addition, the best case delay is typically 2.32 ns and the worst case delay is typically 5.73 ns.

Having determined or measured a round trip delay range, the temperature compensation system 300 may now map the delay setting 175 from the calibration block 170 to a temperature compensated delay setting 180 (i.e., a mapped delay) to be output to the delay unit 140. As mentioned above, in the case of the RLDRAM interface 195, the typical round trip delay is typically 3.75 ns, the best case delay is typically 2.32 ns, and the worst case delay is typically 5.73 ns. This mapping may be performed in accordance with the following table.

| Return Clock Value (0, 1) | Calibrating Block Delay (0-63) | Temperature Compensation System Delay (0-63) | Comments |
| --- | --- | --- | --- |
| 1 | 0-63 | =Calibrating Block Delay (0-63) | Typical |
| 0 | 0-31 | =Calibrating Block Delay + 32 (32-63) | Best Case |
| 0 | 32-63 | =Calibrating Block Delay − 32 (0-31) | Worst Case |

In the above table, return clock value ("Val") is the state or value of the return clock 160. It may be either 1 (i.e., high) or 0 (i.e., low). The calibrating block 170 increments until it samples a different value of the return clock 160. Then it backs up and proceeds in the opposite direction unit it meets the other edge. Val is simply the value that is sampled by the calibrating block 170. Depending on the round trip delay, the calibrating block 170 will either read a Val=1 or Val=0. It will then determine a delay setting 175 that will indicate the middle of the window (i.e., between the two switching edges of the return clock pulse). Thus, the calibrating block 170 locates two edges in the return clock pulse 160 and the Val value indicates whether these edges occurred when the return clock was high (Val=1) or low (Val=0).

Referring to the above table, if Val=1 and the delay setting 175 from the calibrating block 170 is between 0 and 63 steps (i.e., of 80 ps each) and the round trip delay is typical, then the output of the temperature compensated delay setting 180 from the temperature compensation system 300 will equal the delay setting 175. If Val=0 and the delay setting 175 from the calibrating block 170 is between 0 and 31 steps and the round trip delay is best case, then the output of the temperature compensated delay setting 180 from the temperature compensation system 300 will equal the delay setting 175 plus 32 steps. And, if Val=0 and the delay setting 175 from the calibrating block 170 is between 32 and 63 steps and the round trip delay is worst case, then the output of the temperature compensated delay setting 180 from the temperature compensation system 300 will equal the delay setting 175 minus 32 steps.

Figure 2:
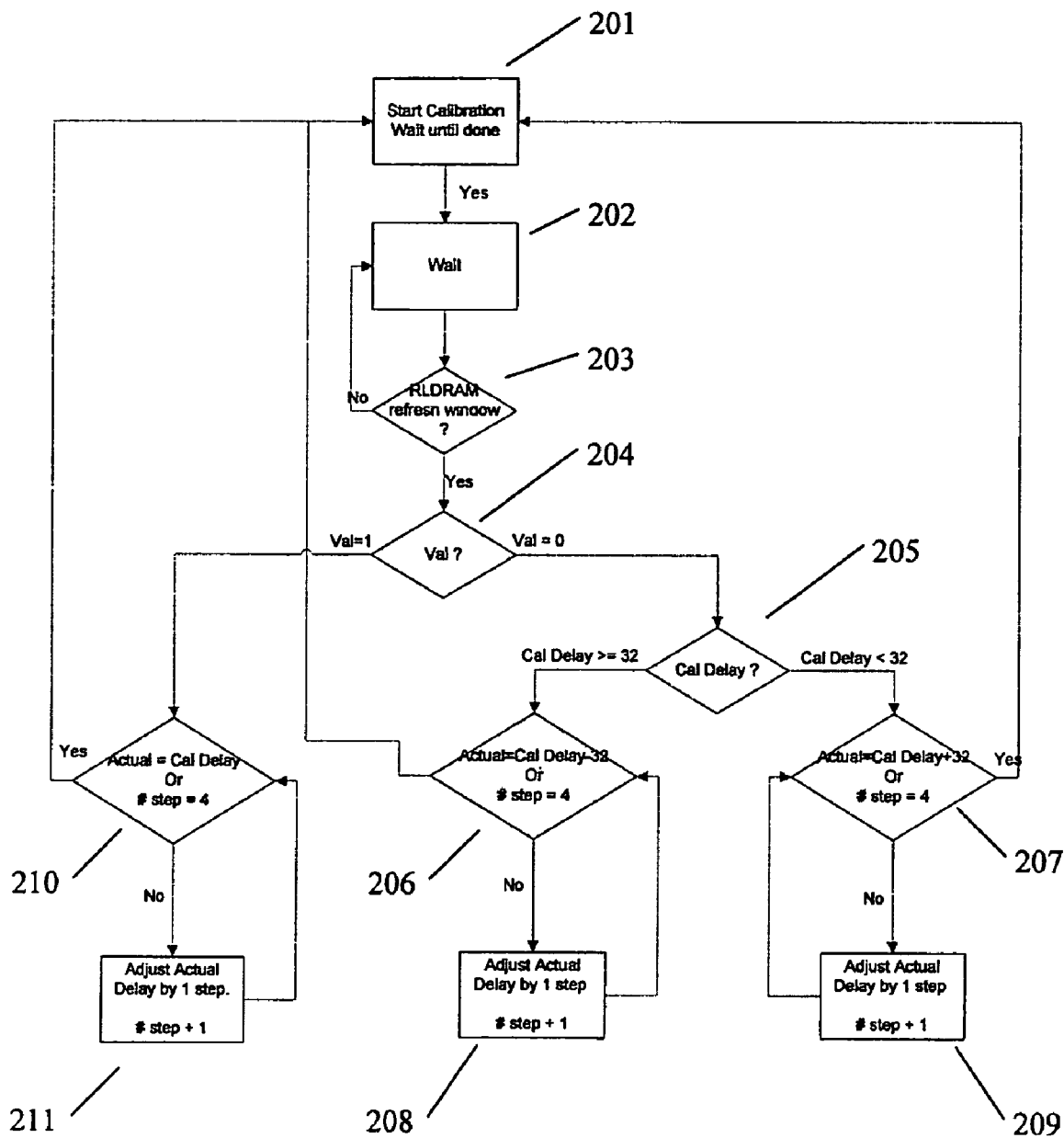
FIG. 2 is a flow chart illustrating operations of modules within the memory of a temperature compensation system for determining a temperature compensated delay setting in accordance with an embodiment of the invention; and, FIG. 3 is a flow chart illustrating operations of modules within the memory of a temperature compensation system for synchronizing a data signal to a clock signal in a source-synchronous system, the source-synchronous system having first and second systems linked by an interface, the first system providing the clock signal to the second system, the second system providing the data signal and a return clock signal synchronous to the data signal to the first system, in accordance with an embodiment of the invention.

FIG. 2 is a flow chart illustrating operations 200 of modules 331 within the memory 330 of a temperature compensation system 300 for determining a temperature compensated delay setting 180 in accordance with an embodiment of the invention.

At step 201, the operations 200 start with the temperature compensation system 300 sending a signal to the calibrating block 170 to generate a delay setting 175 and a value ("Val") of the return clock 160.

At step 202, if the RLDRAM 110 is not in a refresh window, the operations 200 wait until the RLDRAM is in a refresh window.

At step 203, a determination is made as to whether the RLDRAM 110 is in a refresh window.

At step 204, if the RLDRAM 110 is in a refresh window, a determination is made as to the value of the return clock 160.

At step 205, if the value of the return clock 160 is 0, the calibrating block 170 determines a delay setting ("Cal Delay") 175.

At step 206, if Cal Delay 175 is >=32 steps, then the temperature compensated delay setting ("Actual") 180 will be set equal to the lesser of Cal Delay 175−32 steps and 4 steps (i.e., # step=4). If Cal Delay 175−32 steps is 4 steps or less, then the temperature compensated delay setting 180 will be set to Cal Delay 175−32 steps and the operations 200 will return to step 201.

At step 207, if Cal Delay 175 is <32 steps, then the temperature compensated delay setting ("Actual") 180 will be set equal to the lesser of Cal Delay 175+32 steps and 4 steps (i.e., # step=4). If Cal Delay 175+32 steps is 4 steps or less, then the temperature compensated delay setting 180 will be set to Cal Delay 175+32 steps and the operations 200 will return to step 201.

At step 208, continuing from step 206, if Cal Delay 175−32 steps is greater than 4 steps, then the temperature compensated delay setting 180 will be adjusted by a maximum of 4 steps. Remaining adjustments to the temperature compensated delay setting 180 will be made by subsequent 1 step increments.

At step 209, continuing from step 207, if Cal Delay 175+32 steps is greater than 4 steps, then the temperature compensated delay setting 180 will be adjusted by a maximum of 4 steps. Remaining adjustments to the temperature compensated delay setting 180 will be made by subsequent 1 step increments.

At step 210, if the value of the return clock 160 is 1, the calibrating block 170 determines a delay setting ("Cal Delay") 175. The temperature compensated delay setting ("Actual") 180 will be set equal to the lesser of Cal Delay 175 and 4 steps (i.e., # step=4). If Cal Delay 175 is 4 steps or less, then the temperature compensated delay setting 180 will be set to Cal Delay 175 and the operations 200 will return to step 201.

At step 211, continuing from step 210, if Cal Delay 175 is greater than 4 steps, then the temperature compensated delay setting 180 will be adjusted by a maximum of 4 steps. Remaining adjustments to the temperature compensated delay setting 180 will be made by subsequent 1 step increments.

With respect to steps 210 and 211, for example, if the current temperature compensated delay setting ("Actual") 180 is 10 steps and a calibration run is performed which yields a delay setting ("Cal Delay") 175 of 15 steps. Then the new temperature compensated delay 180 will be 14 steps. This new temperature compensated delay 180 will be incremented by the remaining 1 step (i.e., to give 15 steps) upon running of the next calibration.

In the case of the RLDRAM 110 described above, only 4 steps are allowed to occur per calibration loop for two reasons. First, the time that it takes to adjust 4 steps is approximately the same as the duration of the refresh window. Second, it is safer to have minimal changes between calibration loops, especially when the changes are meant to address temperature change related delays. Of course, the 4 steps amount may be varied depending on the properties of the memory device 110 and/or FPGA 190.

Thus, according to one embodiment, a calibration routine for synchronizing data signals 150 of a source-synchronous interface 195 to a system clock signal 121 is provided. A returned version of the system clock signal 160 is received from the interface 195 and is compared to the system clock signal 121 to determine a timing difference between the clock signals 121, 160. The data signals 150 are adjusted by adding to them an amount of delay 180 equal to the lesser of the timing difference or an amount that corresponds to a maximum temperature dependent delay variation that could occur since a previous run of the calibration routine. According to one embodiment, the source-synchronous interface 195 may be between a Xilinx™ Virtex™-4 FPGA 190 and either RLDRAM or QDR-II memory devices 110. For example, the calibration routine may be run periodically and the delay setting 175 determined by the calibrating block 170 may be adjusted by up to 320 ps (or 4 steps) by the temperature compensation system 300.

The invention provides several advantages. For example, it provides for an improvement in source-synchronous systems over a wide temperature range with a guaranteed latency.

Figure 3:
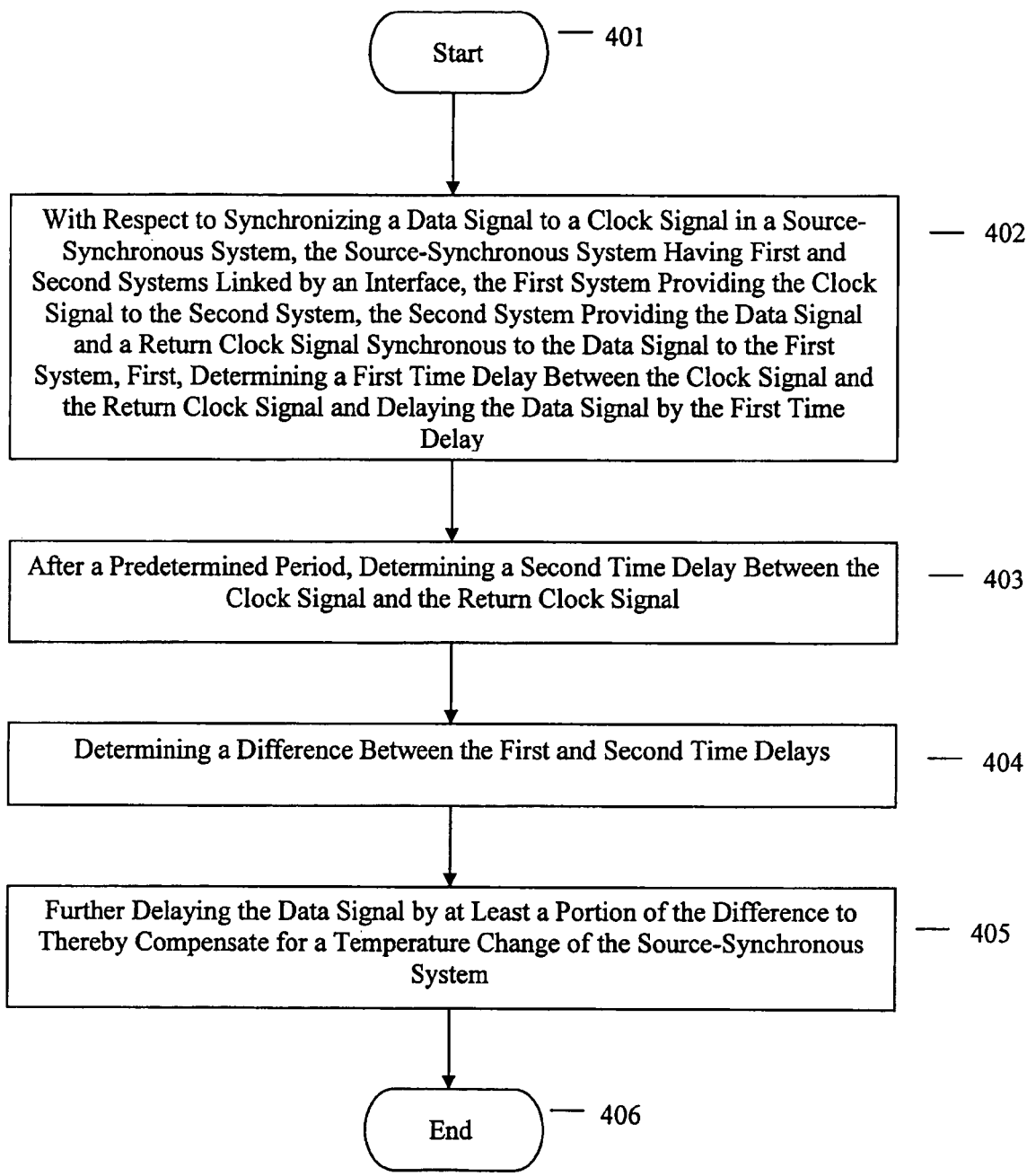

The above described method may be summarized with the aid of a flowchart. FIG. 3 is a flow chart illustrating operations 400 of modules 331 within the memory 330 of a temperature compensation system 300 for synchronizing a data signal 150 to a clock signal 121 in a source-synchronous system 100, the source-synchronous system 100 having first and second systems 190, 110 linked by an interface 195, the first system 190 providing the clock signal 121 to the second system 110, the second system 110 providing the data signal 150 and a return clock signal 160 synchronous to the data signal 150 to the first system 190, in accordance with an embodiment of the invention.

At step 401, the operations 400 start.

At step 402, a first time delay between the clock signal 121 and the return clock signal 160 is determined and the data signal 150 is delayed by the first time delay.

At step 403, after a predetermined period, a second time delay between the clock signal 121 and the return clock signal 160 is determined.

At step 404, a difference between the first and second time delays is determined.

At step 405, the data signal 150 is further delayed by at least a portion of the difference to thereby compensate for a temperature change of the source-synchronous system 100.

At step 406, the operations 400 end.

In the above method, the first time delay may be determined during a start-up period of the source-synchronous system 100. The predetermined period may be one of a warm-up period and a cool-down period for the source-synchronous system 100. The first and second time delays may include a respective amount for centering the return clock signal 160 with respect to the clock signal 121. The first system 190 maybe a field programmable gate array ("FPGA") and the second system may be a memory device 110. The memory device 110 may be a reduced latency dynamic random access memory ("RLDRAM") device. The portion of the difference may be less than or equal to a refresh period for the RLDRAM device 110. The memory device 110 may be a quad data rate ("QDR") synchronous random access memory ("SRAM") device. The portion of the difference may be a minimum time delay increment (e.g., 1 step) chosen to limit the further delaying 405 of the data signal 150 to prevent data signal errors. And, the portion of the difference may be an expected delay due to the temperature change.

While this invention is primarily discussed as a method, a person of ordinary skill in the art will understand that the apparatus discussed above with reference to a temperature compensation system 300, may be programmed to enable the practice of the method of the invention. Moreover, an article of manufacture for use with a temperature compensation system 300, such as a pre-recorded storage device or other similar computer readable medium including program instructions recorded thereon, may direct the temperature compensation system 300 to facilitate the practice of the method of the invention. It is understood that such apparatus and articles of manufacture also come within the scope of the invention.

In particular, the sequences of instructions which when executed cause the method described herein to be performed by the temperature compensation system 300 of FIG. 1 can be contained in a data carrier product according to one embodiment of the invention. This data carrier product can be loaded into and run by the temperature compensation system 300 of FIG. 1. In addition, the sequences of instructions which when executed cause the method described herein to be performed by the temperature compensation system 300 of FIG. 1 can be contained in a computer software product according to one embodiment of the invention. This computer software product can be loaded into and run by the temperature compensation system 300 of FIG. 1. Moreover, the sequences of instructions which when executed cause the method described herein to be performed by the temperature compensation system 300 of FIG. 1 can be contained in an integrated circuit product (e.g., hardware modules) including a coprocessor or memory according to one embodiment of the invention. This integrated circuit product can be installed in the temperature compensation system 300 of FIG. 1.

The embodiments of the invention described above are intended to be exemplary only. Those skilled in this art will understand that various modifications of detail may be made to these embodiments, all of which come within the scope of the invention.

What is claimed is:

1. A method for synchronizing a data signal to a clock signal in a source-synchronous system, the source-synchronous system having first and second systems linked by an interface, the first system providing the clock signal to the second system, the second system providing the data signal and a return clock signal synchronous to the data signal to the first system, the method comprising:

determining a first time delay between the clock signal and the return clock signal and delaying the data signal by the first time delay;

after a predetermined period, determining a second time delay between the clock signal and the return clock signal;

determining a difference between the first and second time delays; and, further delaying the data signal by at least a portion of the difference to thereby compensate for a temperature change of the source-synchronous system.

2. The method of claim 1 wherein the first time delay is determined during a start-up period of the source-synchronous system.

3. The method of claim 1 wherein the predetermined period is one of a warm-up period and a cool-down period for the source-synchronous system.

4. The method of claim 1 wherein the first and second time delays include a respective amount for centering the return clock signal with respect to the clock signal.

5. The method of claim 1 wherein the first system is a field programmable gate array ("FPGA") and wherein the second system is a memory device.

6. The method of claim 5 wherein the memory device is a reduced latency dynamic random access memory ("RLDRAM") device.

7. The method of claim 6 wherein the portion of the difference is less than or equal to a refresh period for the RLDRAM device.

8. The method of claim 5 wherein the memory device is a quad data rate ("QDR") synchronous random access memory ("SRAM") device.

9. The method of claim 8 wherein the portion of the difference is a minimum time delay increment chosen to limit the further delaying of the data signal to prevent data signal errors.

10. The method of claim 1 wherein the portion of the difference is an expected delay due to the temperature change.

11. A temperature compensation system for synchronizing a data signal to a clock signal in a source-synchronous system, the source-synchronous system having first and second systems linked by an interface, the first system providing the clock signal to the second system, the second system providing the data signal and a return clock signal synchronous to the data signal to the first system, the temperature compensation system comprising:
- a processor coupled to memory; and,
- modules within the memory and executed by the processor, the modules including:
- a module for determining a first time delay between the clock signal and the return clock signal and for delaying the data signal by the first time delay;
- a module for, after a predetermined period, determining a second time delay between the clock signal and the return clock signal;
- a module for determining a difference between the first and second time delays; and,
- a module for further delaying the data signal by at least a portion of the difference to thereby compensate for a temperature change of the source-synchronous system.

12. The system of claim 11 wherein the first time delay is determined during a start-up period of the source-synchronous system.

13. The system of claim 11 wherein the predetermined period is one of a warm-up period and a cool-down period for the source-synchronous system.

14. The system of claim 11 wherein the first and second time delays include a respective amount for centering the return clock signal with respect to the clock signal.

15. The system of claim 11 wherein the first system is a field programmable gate array ("FPGA") and wherein the second system is a memory device.

16. The system of claim 15 wherein the memory device is a reduced latency dynamic random access memory ("RLDRAM") device.

17. The system of claim 16 wherein the portion of the difference is less than or equal to a refresh period for the RLDRAM device.

18. The system of claim 15 wherein the memory device is a quad data rate ("QDR") synchronous random access memory ("SRAM") device.

19. The system of claim 18 wherein the portion of the difference is a minimum time delay increment chosen to limit the further delaying of the data signal to prevent data signal errors.

20. The system of claim 11 wherein the portion of the difference is an expected delay due to the temperature change.

* * * * *